United States Patent [19]
Gray et al.

[11] Patent Number: 4,904,066
[45] Date of Patent: Feb. 27, 1990

[54] ELECTRO-OPTICAL DEVICES USING LIQUID CRYSTAL POLYMERS

[75] Inventors: George W. Gray, Cottingham; Gary Nestor, Euxton nr. Chorley; David Lacey, Hull; Ciaran B. McArdle, Pinner, all of England

[73] Assignee: The General Electric Company, p.l.c., England

[21] Appl. No.: 65,271

[22] Filed: Jun. 22, 1987

[30] Foreign Application Priority Data

Jun. 25, 1986 [GB] United Kingdom ............... 8615527

[51] Int. Cl.$^4$ .................... G02F 1/13; C08G 77/20
[52] U.S. Cl. ............... 350/350 S; 252/299.01; 528/32; 528/43
[58] Field of Search ............ 252/299.01; 350/350 S

[56] References Cited

U.S. PATENT DOCUMENTS

| | | | |
|---|---|---|---|
| 4,358,391 | 9/1982 | Finkelmann et al. | 252/299.67 |
| 4,410,570 | 10/1983 | Kreuzer | 252/299.01 |
| 4,702,558 | 10/1987 | Coles et al. | 252/299.6 |

FOREIGN PATENT DOCUMENTS

| | | |
|---|---|---|
| 0140133 | 5/1985 | European Pat. Off. |
| 2146787 | 4/1985 | United Kingdom |

OTHER PUBLICATIONS

"Synthesis, Structure and Properties of Liquid Crystalline Side Chain Polymers" Finkelmann *Polymer Liquid Crystals*, Editor C. Ferri et al., 1982, pp. 35–62.

Mol. Cryst. Liq. Cryst., vol. 122, 1985, P. A. Gemmell et al., "Effects of Molecular Structure on the Properties of Terminally Cyano-Substituted Side Chain Liquid Crystalline Polysiloxanes", pp. 205–218.

Makromol Chem. Rapid Commun., vol. 5, 1985, H. Finkelmann et al., "Investigations on Liquid Crystalline Polysiloxanes", pp. 287–293.

Makromol Chem. Rapid Commun., vol. 3, 1982, H. Ringsdorf et al., "Miscibility Studies of Polymeric and Low Molecular Weight Liquid Crystals and their Behaviour in an Electric Field", pp. 745–751.

Makromol Chem. Rapid Commun., vol. 3, 1982, Ringsdorf et al., "Liquid Crystalline Side Chain Polymers with Low Glass Transition Temperatures", pp. 557–562.

Makromol Chem. Rapid Commun., vol. 2, Finkelmann et al., "Investigations on Liquid Crystalline Polysiloxanes", pp. 317–322.

*Primary Examiner*—Theodore Morris
*Attorney, Agent, or Firm*—Kirschstein, Ottinger, Israel & Schiffmiller

[57] ABSTRACT

Liquid crystal polymers of general formula

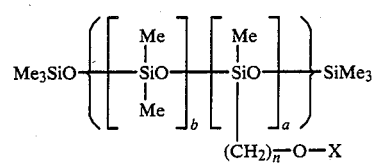

wherein the ratio b : a is less than 3 and greater than O, X is a mesogenic group of formula

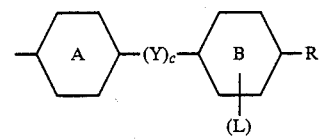

where A and B are cyclic groups, preferably phenyl, which may carry lateral substituents, preferably methyl, R may be F, $CH_3$, CN, $R^1$, $OR^1$ or $COOR^1$ where $R^1$ is alkyl, Y is $COO_1$ $OOC$, $CH_2CH_2$, c is 0 or 1. A preferred group X is

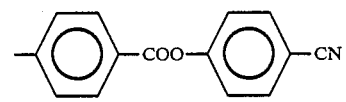

The polymers may be used for optical information stor- (Abstract continued on next page.)

age either alone or in mixture with other liquid crystals
for example with smectic materials of formula
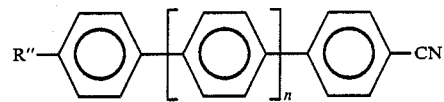
where R″ is alkyl or alkoxy and r is 0 or 1.
13 Claims, 4 Drawing Sheets

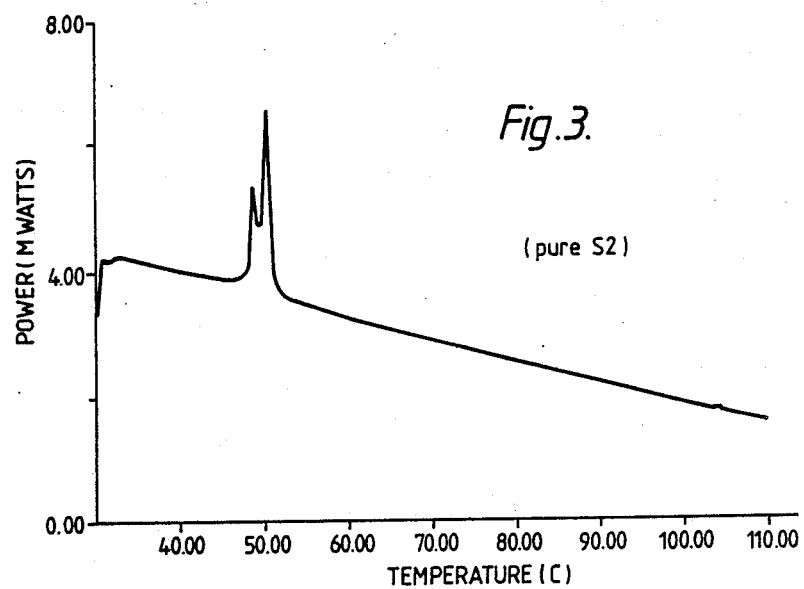
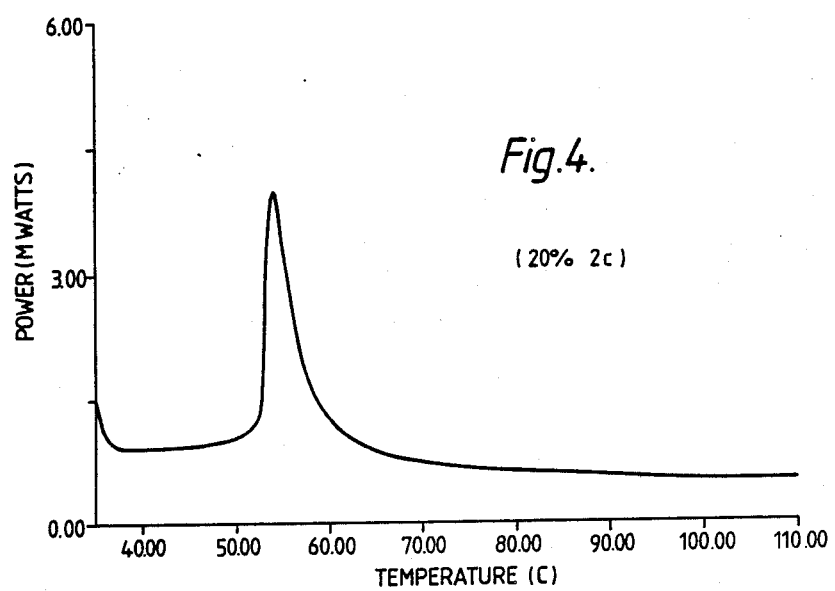

ELECTRO-OPTICAL DEVICES USING LIQUID CRYSTAL POLYMERS

BACKGROUND OF THE INVENTION

1. Field of the Invention

This invention relates to side-chain liquid crystal polymers and to electro-optical devices using them.

2. Description of Related Art

Liquid crystal polymers combine the electro-optic characteristics of low molecular mass ('LMM') liquid crystals, e.g. with a molecular mass typically below 500 with the visco-elastic properties of polymers. In a manner analogous to LMM liquid crystals, liquid crystal polymers show nematic (N), cholesteric (Ch) and smectic (S) mesophases, but on cooling to lower temperatures experience a transition to a viscous or glassy state rather than to a solid crystalline state. In contrast with LMM liquid crystals, whereas the LMM liquid crystal-solid crystal transition destroys liquid crystalline order, the transition to a viscous or glassy state stores it.

Liquid crystal side chain polymers consist of a polymeric backbone from which project mesogenic side groups. The backbone is normally flexible, to allow the side chains to adopt the order of the liquid crystal state, and may be wholly organic, e.g. a polyacrylate or polymethacrylate, or may be an organo-silicon chain, e.g. a polysiloxane chain. As with LMM liquid crystals a wide variety of structures may be concieved for the mesogenic side groups, e.g. sequences of suitably linked cyclic groups such as phenyl, cyclohexyl and heterocyclic rings.

Some typical liquid crystal polymer structures are described for example in the following references:
1. Anal.Chem.(1985), 57, 651–658.
2. Polymer (1985), 26, 1801–1806.
3. Polymer Communications, (1983), 24, 365–365.
4. Makromol.Chem (1985), 186, 2639–2647.
5. Polym.Sci.Technol (1985), 28, 345–50.
6. Makromol Chem Rapid Commun (1985), 6, 57–63.
7. Makromol Chem Rapid Commun (1984), 3, 357–60.
8. Faraday Discuss.Chem.Soc.(1985), 79 paper 10.
9. Published UK patent application No. 2146787A.
10. Mol.Cryst.Liq.Cryst. (1985) 122, 205–218.

In electro-optical devices liquid crystal polymers may be used in a number of ways and a brief review is presented in ref. 8. Liquid crystal polymers may be used simply as additives to LMM monomeric liquid crystal materials, but their principal importance derives from the possibility of long term durable storage of information encoded in the liquid crystalline state, for example in a device by effecting a transition to a liquid crystal state in an addressed area by local heating.

Optical storage in LMM liquid crystal materials is known. The commercially available smectic liquid crystal material S2, available from BDH Ltd (UK) is an excellent optical storage medium, and is currently used as a standard for liquid crystal optical storage. S2 and LMM liquid crystal materials generally suffer from a number of disadvantages as far as optical storage is concerned:

1. stored information is often easily lost by mechanical stress,
2. the liquid crystal transition temperature is often inflexible,
3. the ease with which they may be homeotropically aligned makes writing of fine lines a problem as the material springs back to its aligned form on cooling rather than giving a scattering line ('line shrinkage') so that resolution is limited at certain writing speeds.
4. grey scaling is often difficult.

There is clearly room for improvement even in S2, and some steps toward this have been taken, e.g. Birecki et al, SPIE Proceedings 420 June 1983, p 194 (Ref 11).

In liquid crystal polymers storage of the information may be accomplished in a number of ways. For example U.S. Pat. No. 4,293,435 describes a device in which information may be encoded in a cholesteric texture of a liquid crystal polymer and stored by allowing the polymer to cool below its glass transition temperature (Tg). This device suffers from the disadvantages that Tg must be above normal ambient temperature (Ta, about 20° C.) and that the polymer may need to be heated as much as 100° C. above Ta for recording of information.

Published patent application GB No. 214678A describes a device which uses a different effect, in which information is stored in a polymer in a viscous state above Tg and which persists over Ta. In such a device, at a temperature Tf (above Ta) a texture change occurs from an anisotropic but opaque state to a more fluid state which is highly birefringent and thus optically transmitting, and may also be aligned by a suitable electric field in a manner analagous to LMM liquid crystals (see FIG. 1). The degree of optical transmission increases with temperature in this fluid region until a temperature Tb, at which the isotropic phase beings to appear, and thereafter transmission drops until the clearing temperature Tc is reached, at which the last of the birefringent structure disappears.

On heating the polymer to the vicinity of Tb, an optically transmitting state may be produced which is "frozen in" and stored when the temperature drops below Tf. In a device using such polymers Tg is less critical and may be below Ta, and less heating of the polymer is necessary.

Such devices may exploit the field alignment properties of N, Ch or S liquid crystal phases for storage purposes, but generally smectic polymers are preferred for better order and higher contrast. The quality of the display and the level of storage may be improved by for example the incorporation of pleochroic dyes, by laser addressing and by using birefringence effects e.g. with crossed polarisers. Some such methods are described in Refs 1 and 2.

Some efforts have been made to attempt to prepare mixtures of liquid crystal polymers and LMM liquid crystal materials, for example Ringsdorf et al Makromol Chem Rapid Commun. (1932) 3, 745 (Ref 12) reports on miscibility studies of nematic liquid crystal polymers with LMM liquid crystal materials. Miscibility problems were encountered, and no mention is made of the appearance of a biphasic region at Tb. Such mixtures could not have faster responses than the LMM nematic materials and could only offer advantages over nematic polymers. A similar but rather inconclusive study is reported in Ref. 8, discussing nematic non-storage applications of such mixtures.

It is an object of the invention to provide novel liquid crystal polymers primarily but not exclusively for optical storage purposes, and novel optical storage liquid crystal mixtures and devices incorporating them.

To date, most of the liquid crystal polysiloxanes which have been produced have been based upon the structure:

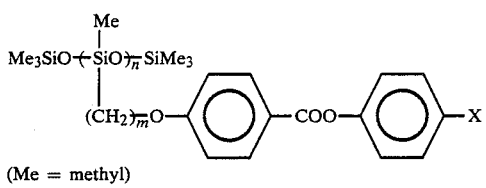

(Me = methyl)

where X is O-Alkyl or COO-Alkyl. This is for a number of reasons, among which is the historical reason that structures of this type are more likely to be nematogenic, and when X is CN cross linking is more likely to occur. Early attention was as a consequence therefore concentrated on nematic materials for use in fast-switching display devices. It is only comparatively recently that interest has shifted to materials of smectic character for use in the durable storage devices discussed above.

Janini et al (Ref 6) and Gemmel et al (Ref 10) discuss some of the chemical factors that affect the properties of liquid crystal polymers, e.g. altering m in the structure shown above, i.e. to change the "spacer" length, or to dilute the mesogenic segments of the polymer chain with non-mesogenic segments to alter the relative degree of polymerisation and liquid crystal character. Their conclusions are that although trends may be observed, there is still much scope for experimentation to identify useful classes of liquid crystal polymer compounds.

According to the invention there is provided a novel liquid crystal polymer having a general formula:

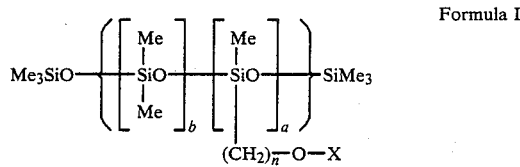

Formula I wherein X is a mesogenic group having a general structure:

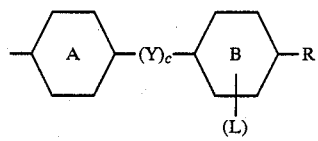

wherein rings

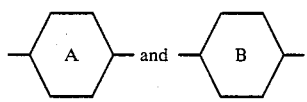

may carry lateral methyl, fluoro, or chloro-substituents, and are selected from phenyl, trans-cyclo hexyl, pyridyl, pyrimidyl, dioxanyl and bicyclo-(2,2,2) octyl; wherein Y is COO, OOC, or $CH_2CH_2$; c is 0 or 1; Me is methyl; wherein n is an integer between 4 and 9 inclusive; wherein R is F, $CF_3$, CN, R', OR' or COOR' where R' is alkyl, and (L) indicates that a lateral methyl or fluoro substituent may be present; in cases other than when R is CN and U is COO and n=5 and C=1, L=$CH_3$: wherein the ratio b:a is less than 3 and greater than 0.

The average degree of polymerisation $\overline{DP}$ is preferably in the range 10–100, especially 10–40.

In the liquid crystal polymer of Formula I the dimethyl siloxane and methyl siloxane-$(CH_2)_n$—o—X units are randomnly or substantially randomnly distributed in the polymer structure, and the representation in Formula I is therefore essentially schematic rather than being intended to show a block copolymer.

Rings

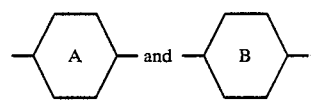

are preferably phenyl. R is preferably n-alkyl containing 1–5 carbon atoms especially methyl, or a chiral alkyl containing 4–8 carbon atoms especially 2-methylbutyl or 1-methylheptyl.

Some preferred structures for the group X are listed in Table 1 below:

TABLE 1

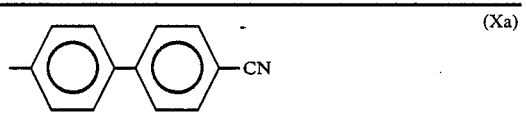 (Xa)

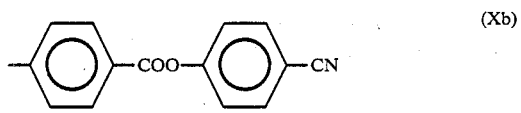 (Xb)

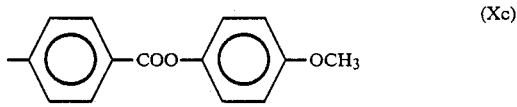 (Xc)

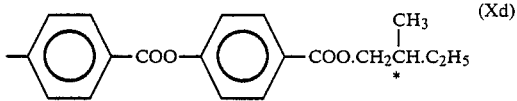 (Xd)

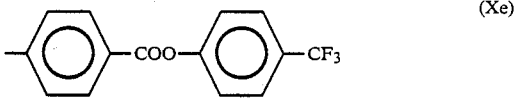 (Xe)

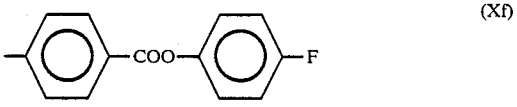 (Xf)

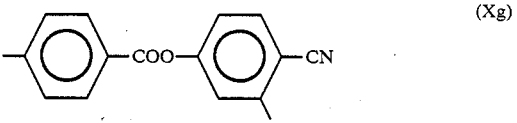 (Xg)

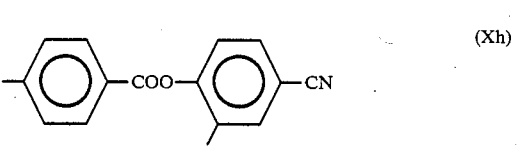 (Xh)

TABLE 1-continued

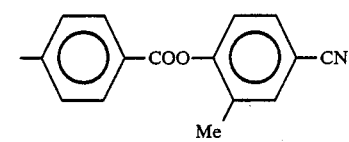
(Xi)

The ratio b:a is preferably around 1:1, for example between 1.4:1 and 1:1.4. This ratio represents the ratio of the segments contributing polymeric character (b) to those contributing liquid crystal character (a). The poly dimethyl siloxane chain has virtually no energy barrier to rotation and is one of the most flexible polymeric chains known, and therefore increasing the ratio b:a increases the flexibility of the polymer backbone, reduces viscosity and lowers Tg. As increasing B:a also reduces the liquid crystal character of the polymer, higher b:a ratios will also tend to destabilise the liquid crystal phases and reduce Tc.

A preferred range for n is 4–8. The length of the 'spacer' is one of the main factors determining the degree of decoupling between the mesogenic side groups and the polymeric chain. This too has an influence on the balance between polymeric and liquid crystal properties, and also the appearance of smectic phases in the liquid crystal polymer. Although a trend observed in some cases is toward a more ordered system as the spacer length is increased, with generally an increase in Tc and a drop in Tg, there is much evidence that the spacer cannot be regarded simply as an inert structure used to decouple the motions of the backbone and mesogenic groups, but that its chemical nature has an influence on side group packing in the liquid crystal phases, and hence on mesophase range and stability.

The nature of the mesogenic group X will also have an effect on the properties of the liquid crystal polymer. Generally speaking groups where X is CN favour the appearance of smectic phases. Increasing the complexity or the degree of conjugation of the group X tends to increase the thermal stability of liquid crystal phases. Terminal substituents R which increase the length to breadth ratio of the group X generally raise Tc. When the lateral methyl substituent (Me) is present in X, then a short spacer, i.e. low n may tend to destabilise the liquid crystal phases. It has often been observed that there is not necessarily any correlation between the types of liquid crystal phases shown by a liquid crystal polymer and by a LMM liquid crystal material containing the same mesogenic groups, a consequence of the greater ordering in the polymeric system.

The average degree of polymerisation $\overline{DP}$ is the average number of silicon atoms in the polymeric chain of Formula I, i.e. the average value of a+b. In a sample of polymer there will usually be a spread of DP, and the preferred range is 10–40.

An important factor influencing the properties of a liquid crystal polymer of the invention is the poly dispersity (Z). This is a measure of the distribution of polymer chain lengths in a bulk sample of the liquid crystal polymer.

Z is defined as:

$$Z = \overline{Mw}/\overline{Mn}$$

where Mw is the weight-average molecular weight and Mn is the number-average molecular weight.

$$Mw = \frac{\int f(M)M^2 \cdot dm}{\int f(M)M \cdot dm}$$

and can be determined experimentally e.g. by measurement of turbidity, and where $$Mn = \frac{\int f(M)M dm}{\int f(M) dm} = \frac{\text{weight}}{\text{No. of moles in sample}}$$

and may also be determined experimentally, e.g. by analysis of the number of end groups, and by osmotic pressure, cryoscopic or ebullioscopic methods.

Z is related to the absolute values of a and b and their spread in the sample. Z influences the transition temperatures, and the sharpness with which transitions occur with changing temperatures, as different liquid crystal polymer fractions exhibit phase transitions at different temperatures in samples containing less than ca. 50 siloxane units. Lower molecular weight fractions generally undergo phase transitions at lower temperatures than higher molecular weight fractions. For use in information storage applications such as the devices described above it is preferred that Z is greater than 1 but less than around 20, and samples with Z of about 2 have been found to be suitable.

A general method of preparation of the liquid crystal polymers of the invention is by means of the reaction between a suitable poly(hydrogen methyl/dimethyl) siloxane ("P(HM/DM)S") and a mesogenic terminal alkene in the presence of a suitable catalyst. This is represented schematically below:

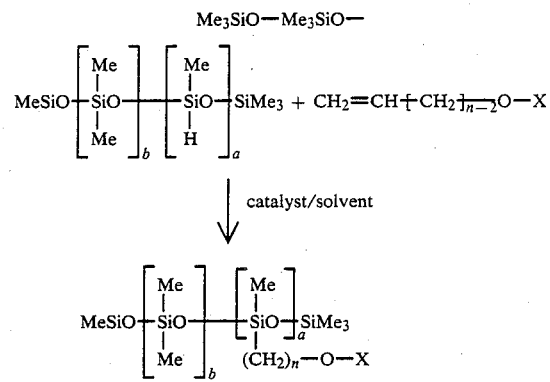

In this reaction, the overall silicone chain structure of the backbone, and such variables as the b:a ratio, DP, Z etc may be assumed to be those of the starting P(HM/DM)S. If the polymers of formula I are prepared using this general reaction it is therefore more convenient to measure these variables for the starting P(HM/DM)S than to attempt measurement of the properties of the end product polymer.

Many P(HM/DM)S materials are commercially available e.g. from ICI, Dow, or from the American company Petrarch, with manufacturers' specifications of these parameters. They may however be checked by the following methods, among others, so that the parameters of the product polymer of Formula I may be accurately known.

$^{29}$Si nmr can be employed to provide information about the Si environment in the polymer. End group analysis by $^{29}$Si nmr enables estimation of the number of —SiMe$_3$ termini in the material, hence the number of molecules in a sample, hence $\overline{Mn}$. The splitting of the $^{29}$Si resonances of the non-terminal Si may be used to ascertain whether the polymer is in fact statistically random, and may also be used to determine the b:a ratio, i.e. by virtue of the different Si(HMe) and SiMe$_2$ environments. $^1$H nmr may also be used to determine starting H-Me ratios.

Determination of $\overline{DP}$ may be made by viscosity or preferably by GPC analysis of the starting P(HM/DM)S. Light scattering methods may be used to determine $\overline{Mw}$ of the P(HM/DM)S.

Other known methods may be used to determine $\overline{DP}$, $\overline{Mw}$, $\overline{Mn}$, and will be apparent to those skilled in the art.

It will therefore be apparent that all of the factors discussed above will act together in determining the balance between liquid crystalline and polymeric character of a liquid crystal polymer of the invention. The scope of the invention as defined herein therefore identifies a range of structural types of liquid crystal polymers with properties that render many members of the range useful for information storage purposes.

The liquid crystal polymers of the invention may be used in any of the ways discussed above.

They may for example be used as additives in known LMM liquid crystal materials. When used in this way they may usefully modify the elastic constants of the bulk LMM material, and the dielectric properties of the side groups may also modify the bulk dielectric properties of the LMM material. Such mixtures may also contain other compounds well known in the art to modify the dielectric anisotropy, to reduce melting point or viscosity, or to improve the multiplexibility or clearing point of the mixture. It is preferred that when used in this way the LMM liquid crystal material contains at least one compound having the same or a closely related mesogenic group, for example if in Formula I, X is:

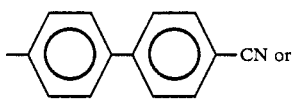

or

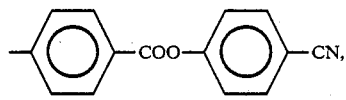

then a preferred LMM liquid crystal material contains compounds such as those described in UK Pat. No. 1433130, for example of general formula II:

where n is 0 or 1 and R" is alkyl or alkoxy. Compounds of formula II are a widely used class of LMM liquid crystal materials and they may be suitable for use in this way with liquid crystal polymers having a group X of any of the structures defined in formula I.

Mixtures of this type are part of the invention insofar as they include a polymer of Formula I. They may be used in any of the known types of liquid crystal device which use the particular LMM material showing analogous liquid crystal phases.

The principal use of the liquid crystal polymers of the invention is in the electro-optical information storage devices of the type discussed above, and in particular in thermal or field addressed devices, such as those of U.S. Pat. No. 4,293,435 or UK patent application No. 2146787A.

The liquid crystal polymers of the invention are especially suited to the device of the type described in UK patent application No. 2146787A, as many of them show the series of transitions Tg-Tf-Tb-Tc with increasing temperature, Tg being below Ta. These transitions also often occur at temperatures which are convenient for thermal addressing by for example a focussed laser or incandescent lamp beam.

Using the polymers of the invention in such a device, i.e. containing a liquid crystal polymer as the bulk constituent, it has been found preferable to elevate the temperature of the polymer in the thermal addressing step to above Tc rather than into the region Tb-Tc, i.e. into the isotropic region. Heating above Tc is found to improve the durability of stored information considerably.

When used in such a device the polymers may be used alone. Alternatively their properties may usefully be modified, especially to increase Tf-Tg. This may be achieved by:

(i) Selecting polymers of lower molecular weight, although if the average molecular weight is less than ca 3000 this may be accompanied by a lowering in viscosity of the viscous state.

(ii) Altering the polydispersity—this may also improve the sharpness of transitions.

(iii) Using a mixture of polymers of Formula I having different b:a, n, X, $\overline{DP}$, or Z.

(iv) Mixing the polymer or mixture of polymers with LMM liquid crystal materials (preferably having the same mesogenic group), solvents or dyes, e.g. pleochroic dyes. The addition of such small molecules may substantially depress Tg without affecting the other transition temperatures.

Preferred pleochroic dyes are anthraquinone dyes, especially those available from BDH Ltd as pure dye D16 or as sold in mixtures with liquid crystal materials e.g. D102. These are soluble in the liquid crystal polymers of the invention and show little tendency to crystallise. Other suitable pleochroic dyes include for example those described in UK Pat. No. 2155845, and the azo and anthraquinone dyes below:

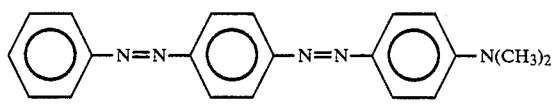

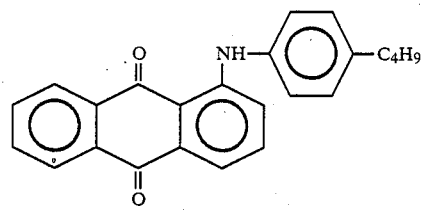

Concentrations of dye of around 2-4 wt. % in the polymer have been found to be quite adequate.

In another, and particularly preferred use, polymers of formula I may be used in mixtures with LMM smectic liquid crystal optical storage materials, to obtain mixtures with improved properties relative to both the polymer and the LMM material.

In accordance with this aspect of the invention, a material suitable for use as an optical storage medium comprises a mixture of at least two components, at least one of which is a LMM liquid crystal material which shows a smectic phase and at least one of which is a polymer of formula I.

Many such LMM liquid crystal materials are known.

Preferred polymers of formula I for use in the material of this aspect of the invention are those identified above as being generally suitable for optical storage, especially the preferred polymers of formula I above, and particularly those which show smectic phases, e.g. those having X of structure Xb.

The smectic LMM liquid crystal material may be a single compound or a mixture of compounds. A generally preferred class of compounds is represented by formula II where n is 0 or 1, and R'' is n-alkyl or n-alkoxy containing 8 to 12 carbon atoms. Mixtures of this class of compounds are also preferred, e.g. S2 which has a composition:

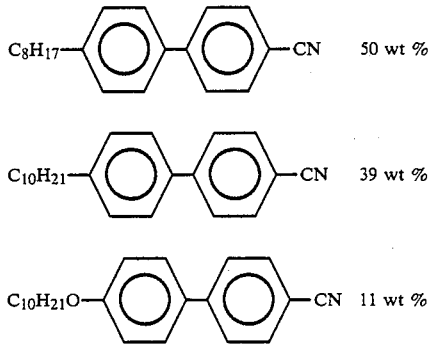

$C_8H_{17}$—〈〉—〈〉—CN   50 wt %

$C_{10}H_{21}$—〈〉—〈〉—CN   39 wt %

$C_{10}H_{21}O$—〈〉—〈〉—CN   11 wt %

The smectic material may be one that shows optical storage properties by itself, or it may be one that only shows such properties when mixed with the polymer of Formula I.

The mixture may also contain other known additives to modify its properties, such as pleochroic dyes e.g. the dyes referred to above, other LMM liquid crystal materials, e.g. the materials K24, K27, K30, K33, K36, S1, S3, S4, and S5 marketed by BDH Ltd., and may also contain other liquid crystal polymers e.g. of Formula I.

Mixtures according to this aspect of the invention show the unexpected property that there appears to be in many cases no miscibility problem between the polymer and the LMM smectic material over the whole composition range, and that advantageous properties may be found in mixtures over the entire composition range. The mixture may therefore contain 1–99 wt. % of either the polymer(s) or the LMM smectic material, the total being 100 wt. % including any of the additives referred to above if present. Pleochroic dyes may for example be present to about 5 wt. % or less, typically about 3%.

By varying the proportions of the polymer(s) of Formula I and the LMM smectic material it is often possible to tune the appearence of the biphasic region, i.e. Tb over a wide temperature range, e.g. in the case of S2/polymer mixtures between 48°–100° C. In this way an optical storage material of variable sensitivity to an addressing heat source, e.g. a laser beam, may be achieved.

Changing the proportions of the polymer(s) of Formula I and the LMM smectic material will affect the viscosity of the mixture, in effect plasticising the polymer(s) but increasing the viscosity of the LMM material. This enables the production of an optical storage liquid crystal material with less sensitivity to mechanical stress than the LMM material, but with a viscosity lower than that of the polymer(s) which enables easy filling of a device with the mixture.

As the electrical resistance behaviour of liquid crystal polymers and LMM materials are different, i.e. the resistance of a polymer generally rises to a maximum with increasing temperature, then falls to a value much lower than the value at ambient, but that of the LMM material gradually drops with increasing temperature across the smectic range, being lower at the S-N transition, and then falling rapidly in the nematic region, by judicious choice of the polymer and LMM smectic components of the mixture a material of advantageous electrical resistence may be obtained. Thus higher electrical fields may be used for faster selective and bulk erasure in optical storage without degradation of the material, fatigue due to continuous operation may be lessened by high resistivity materials, and large area devices may be made which could not be made using polymer liquid crystal storage materials alone.

The use of such mixtures may also alleviate to some extent the line shrinkage problem encountered with LMM liquid crystal storage materials.

Mixtures of this aspect of the invention may be used in any of the known types of liquid crystal optical information storage device for which LMM liquid crystal optical storage materials could be used. According therefore to a further aspect of the invention there is provided an electro-optic liquid crystal information storage device which uses a polymer of Formula I.

The invention will now be described by way of example only with reference to the following figures in which:

FIGS. 3, 4, 5, 6 and 7 show DSC traces of mixtures of a polymer of formula I with the liquid crystal material S2, and of S2 and the polymer alone.

Figure 1:
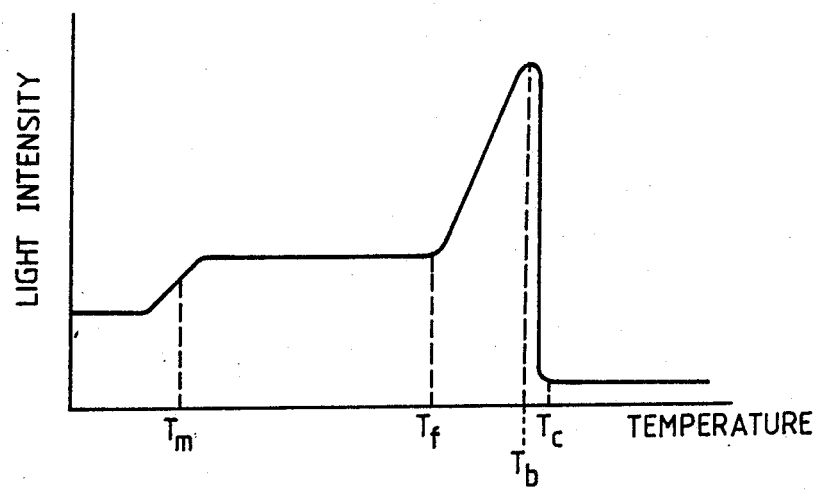
FIG. 1 shows a typical Thermo-Optical Analysis (TOA) trace for a liquid crystal polymer of the invention.
Figure 2:
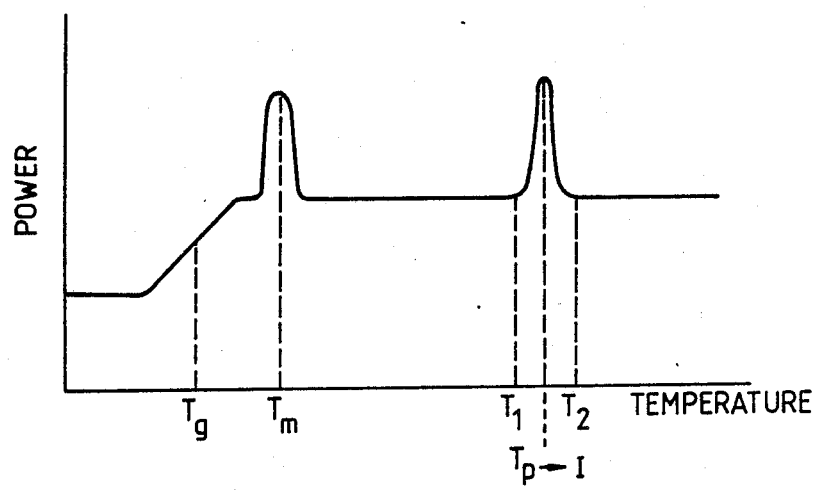
FIG. 2 shows a typical Differential Scanning Calorimetry (DSC) trace for a liquid crystal polymer of the invention.
Figure 5:
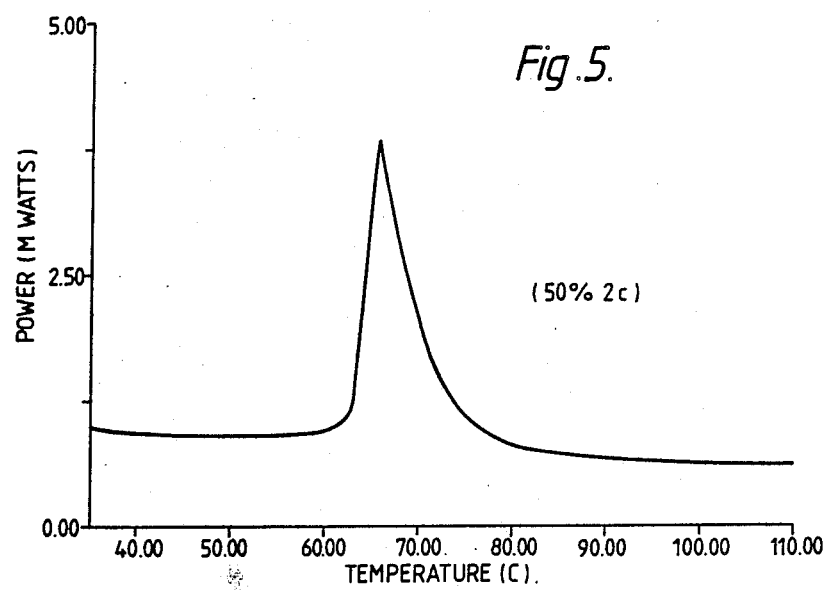
Figure 6:
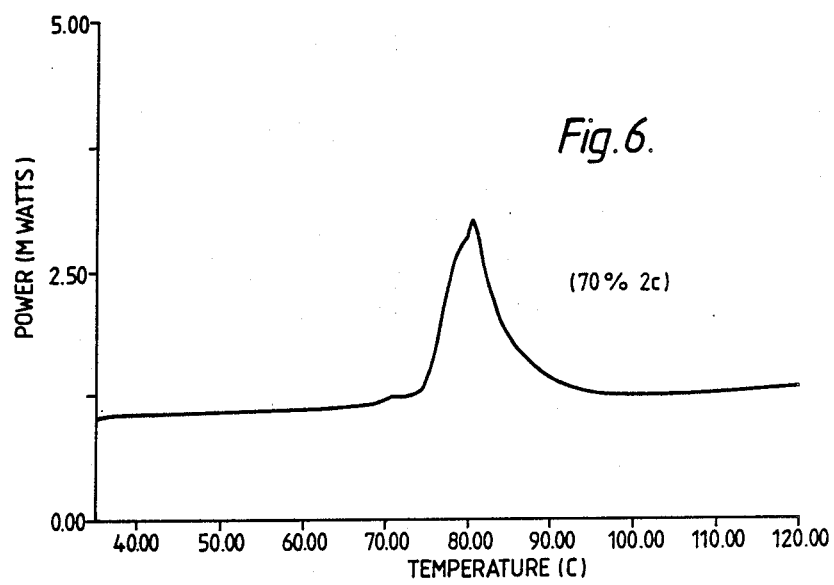
Figure 7:
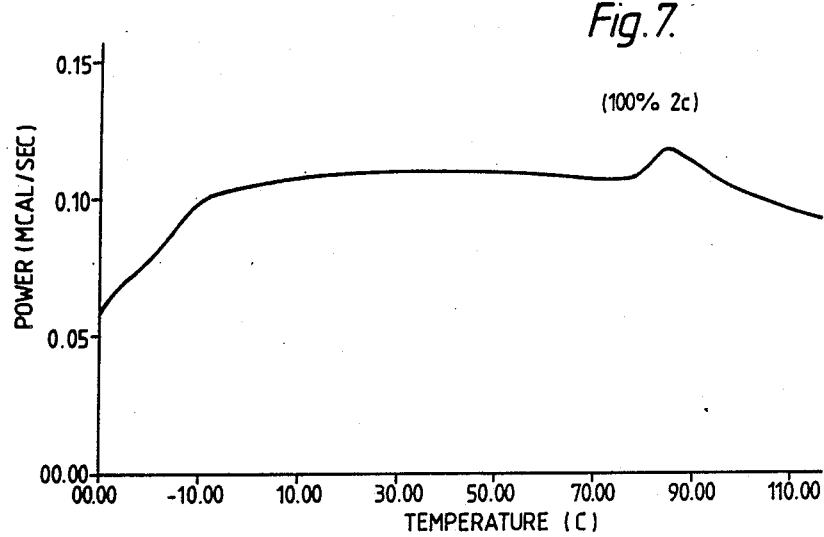

Referring to FIGS. 1 and 2, the optical and thermal effects of changing the temperature of a polymer of the invention are shown.

In these figures:

---

Tg = glass transition temperature.
Tm = melting temperature.
Tf = onset of fluid state
$T_b$ = onset of biphasic state, at which isotropic phase begins to appear.
$T_c$ = clearing temperature.
$T_{p\text{-}I}$ = the maxium temperature on the DSC trace relating to the transition from phase to isotropic liquid. $T_1$ and $T_2$ are the start and finish of this transition, and thus $T_2$-$T_1$ represents the sharpness of this transition. $T_{S\text{-}I}$ is an The mesogenic terminal alkenes were prepared by the following literature routes:

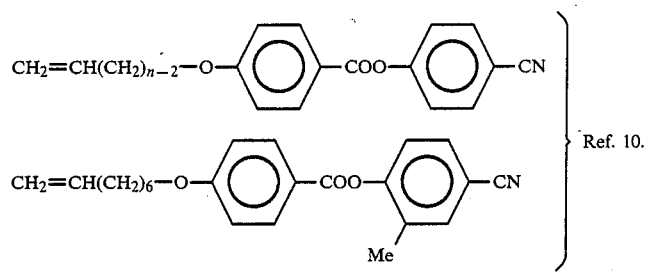
Ref. 10.

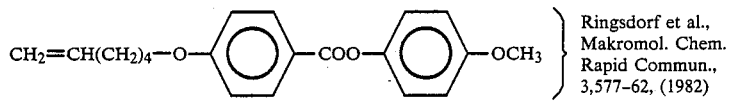
Ringsdorf et al., Makromol. Chem. Rapid Commun., 3, 577–62, (1982)

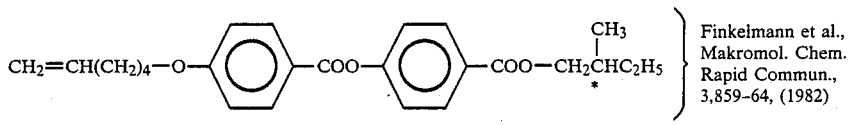
Finkelmann et al., Makromol. Chem. Rapid Commun., 3, 859–64, (1982)

equivalent term indicating a transition from a smectic state to the isotropic liquid.

PREPARATION OF LIQUID CRYSTAL POLYMER

P(HM/DM)S starting materials were obtained commercially from the Petrarch (USA) chemical company as their product PS 122.5, and from ICI plc (UK). PS 122.5 was stated to contain 50–55% hydromethyl and 45–50% dimethyl-siloxane units (i.e. nominally 50:50, b:a=1). Prior to use samples were checked by nmr to verify the manufacturers specifications. Other P(HM/DM)S starting materials which were similarly checked are:

| Supplier | a:b (nominal) |
|----------|---------------|
| Petrarch | 50:50 |
| ICI | 42:58 |
| Petrarch | 85:15 |

The properties of the starting polymer PS 122.5 were measured using (i) GPC analysis in toluene solution on PL gel 30 cm column, 10 μm packing ($10^3$–$10^5$ Å) ambient temperature, flow rate 1 ml/min. Calibration was based on a third order polynomial expression to give polystyrene equivalent molecular weights, (ii) $^1$H nmr, average of 5 integrations, end group analysis. The results were:

| (i) | | | (ii) | | |
|-----|-----|-----|-----|-----|-----|
| $\overline{Mw}$ | $\overline{Mn}$ | Mw/Mn (= Z) | $\overline{Mn}$ | $\overline{DP}$ (= a + b) | a:b |
| 2400 | 1300 | 1.9 | 1100 | 13 ± 2 | 1:1.17 |

To a mixture of a P(HM/DM)S having the required b:a ratio (0.6 g, 4.5 mmol (Si—H)) and the side chain alkene (4.95 mmol, 10% excess) in dry toluene (60 ml), the catalyst $H_2PtCl_6$ (Speier's Catalyst) in solution in toluene was added to give a Pt: alkene ratio of between 1:$10^3$–$10^6$ (the quantity depending upon the mesogenic side chain being used). The whole procedure was carried out in a nitrogen atmosphere.

The mixture was then heated under reflux for about 18 hours, or until no Si—H (2140 cm$^{-1}$) was detectable by IR spectroscopy of a sample. Oct-1-ene was then added to the reaction mixture, in a two molar excess (based upon the original Si—H concentration) to 'mop-up' any remaining Si—H sites and to prevent crosslinking in the work-up procedure. The reaction mixture was then heated under reflux for a further 2 hours.

The polymer was then isolated by precipitation with methanol and subsequent centrifugation. Purification of the polymer was achieved by precipitating the polymer several times from dichloromethane by the addition of methanol.

Having prepared the polymers in this way it was found to be highly desirable to remove traces of the mesogenic terminal alkene. Generally 6 to 10 precipitations from dichloromethane were found to be adequate to achieve this.

The polymers were dried as the isotropic melt under vacuum (below 0.5 mm Hg) to remove all traces of solvents. Drying was considered complete when constant transition temperatures were observed. Yields of polymers were generally about 40–50% by weight.

Some properties of polymers prepared in this way are listed below:

| Polymer identification (all prepared with PS 122.5) | | | |
|---|---|---|---|
| X | n | b:a | Code |

-continued

Polymer identification (all prepared with PS 122.5)

| Mesogen structure | n | ratio | Polymer code |
|---|---|---|---|
| –⟨phenyl⟩–⟨phenyl⟩–CN | 5 | 1.17:1 | 1 |
| –⟨phenyl⟩–COO–⟨phenyl⟩–CN | 6 / 5 / 4 | | 2 / 3 / 7 |
| –⟨phenyl⟩–COO–⟨phenyl⟩–COOCH$_2$CH(CH$_3$)C$_2$H$_5$ * | 6 | | 4 |
| –⟨phenyl⟩–COO–⟨phenyl⟩–OCH$_3$ | 6 | | 5 |
| –⟨phenyl⟩–COO–⟨phenyl(Me)⟩–CN | 8 | | 6 |
| –⟨phenyl⟩–COO–⟨phenyl(F)⟩–CN | 6 / 5 | | 8 / 9 |
| –⟨phenyl⟩–COO–⟨phenyl(F)⟩–CN | 5 / 6 | | 10 / 11 |
| –⟨phenyl⟩–COO–⟨phenyl⟩–CF$_3$ | 5 / 6 | | 12 / 13 |
| –⟨phenyl⟩–COO–⟨phenyl⟩–F | 5 / 6 | | 14 / 15 |

DSC Data
(in °C. and J/gm, scanning rate 10° C. per minute)

| Polymer code | $T_g$ | $T_m$ | $T_{S-I}$ | $T_1$ | $T_2$ | $\Delta H_{S-I}$ |
|---|---|---|---|---|---|---|
| 1 | −14 | | 95 | 87 | 107 | 5.23 |
| 2 | −12 | | 85 | 78 | 100 | 3.43 |
| 3 | −9 | | 97 | | | 5.02 |
| 4 | −25 | | 30 | 22 | 39 | 3.64 |
| 5 | −15 | | 52 | 47 | 57 | 1.17 (N–I) |
| 6 | −15 | | 57 | 51 | 65 | 3.68 |
| 7 | −9 | | 72 | 64 | 82 | 2.72 |

TOA Data
(in °C. $T_c^m$ = Tc from microscopic observation)

| Polymer code | Tm | Tf | Tb | Tc | $T_c^m$ |
|---|---|---|---|---|---|
| 1 | | 85 | 95 | 110 | 109 |
| 2 | | 78 | 85 | 100 | 100 |
| 3 | | 88 | 93 | 109 | |
| 4 | | | 27 | 39 | |
| 5 | | | 49 | 53 | |
| 6 | | 51 | 55 | 62 | |
| 7 | | 65 | 75 | 87 | 85 |

| Polymer code | $T_g$ | $T_m$ | $T_{SB-SA}$ | $T_{SA-I}$ | $T_2-T_1$ | $H_{Tm}$ | $\Delta H_{SA-I}$ |
|---|---|---|---|---|---|---|---|
| 8 | −19 | | | 78 | 17 | | 3.45 |
| 9 | −15 | | | 80 | 19 | | 3.74 |

-continued

| Polymer identification (all prepared with PS 122.5) | | | | | | |
|---|---|---|---|---|---|---|
| 10 | −4 | 13 | 66 | 16 | 3.01 | 3.29 |
| 11 | −5 | 14 | 72 | 14 | 3.85 | 3.20 |

| Polymer code | $T_m1$ | $T_m2$ | $T_{SB-SA}$ | $T_{SA-I}$ | $T_2-T_1$ | $\Delta H_{Tm2}$ | $\Delta H_{SB-SA}$ | $\Delta H_{SA-I}$ |
|---|---|---|---|---|---|---|---|---|
| 12 | | 76 | 66 | 112 | 45 | 9.68$^a$ | $^b$ | 8.44 |
| 13 | | 76 | 62 | 110 | 50 | 9.41$^a$ | $^b$ | 6.80 |
| 14 | 0 | 39 | | 72 | 35 | 8.51 | 5.14 | |
| 15 | −7 | 39 | | 70 | 34 | 11.35 | | 4.64 |

Note:
all 'T' values in °C.
all ΔH values in Jg$^{-1}$
$^a$precise values not available due to overlap of adjacent peaks.
$^b$values not available due to overlap of transitions.
$T_m1$ is a cooling rate dependent melt transition.
$T_m2$ is a normal melting point
S values in Jg$^{-1}$ K$^{-1}$ × 10$^3$ These polymers therefore show smectic phases in the fluid region, Tf-Tg is around 100° C., Tc is quite close to Tb and the $T_{S-I}$ transition is fairly sharp. Tc is at a conveniently low temperature to allow the temperature of the polymer to be raised above Tc by conventional means in a conventional cell, whereupon optical information storage occurs as the temperature falls below $T_f$.

FIGS. 3, 4, 5, 6, and 7 show respectively DSC traces for pure S2, S2 plus 20 wt. % of the polymer 2, S2 plus 50 wt. % of 2, S2 plus 70 wt. % of 2 and for 2 alone. The DSC scanning rate was 10° C./min. These mixtures are examples of mixtures of an LMM smectic liquid crystal material and a polymer of Formula I, and show optical storage properties in that scattering smectic focal conics formed in the written areas on cooling from the isotropic phase may be stored as the mixture cools below the S-I transition. The viscosities and other bulk properties of these mixtures were intermediate between those of S2 and the polymer.

It is apparent from FIGS. 3 to 7 that the S-I transition temperature of the mixtures shows a smooth variation with composition, and hence there is a corresponding smooth variation in sensitivity to an addressing heat source. Even at up to 70% of polymer $\Delta H_{S-I}$ was 6.38 Jg$^{-1}$.

Further data obtained from these DSC traces are tabulated below.

| DSC data for S2/polymer 2 mixtures. (in °C. and J/gm) | | |
|---|---|---|
| wt % 2c | peak onset | $\Delta H_{S-I}$ Jg$^{-1}$ |
| 0 | 49.5 | 7.61 |
| 20 | 52.6 | 7.31 |
| 50 | 63.1 | 6.38 |
| 70 | 74.9 | 6.38 |
| 100 | 79.8 | 3.43 |

Note: transition temperatures for pure S2 are: K-$S_A$ −1 $S_A$−N 48 N-I 49
K = solid crystal.

Figure 8:
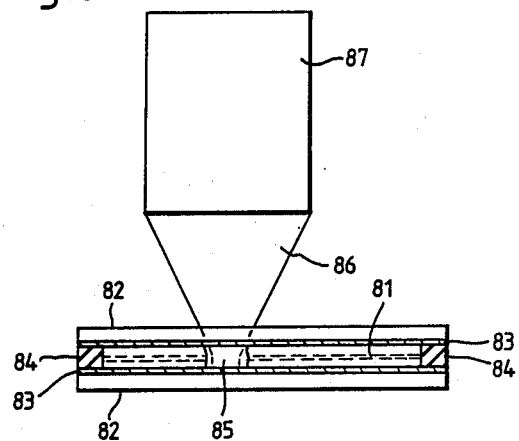
FIG. 8 shows a cross section of an electro-optical information storage device suitable for use with a liquid crystal polymer of the invention.

FIG. 8 shows an electro-optic device suitable for use with liquid crystal polymers of the invention and mixtures containing them which have optical storage properties. The polymer or mixture is contained as a thin film (81) in a cell defined by two glass plates (82) on the inner surface of which are deposited transparent conducting films (83) of indium/tin oxide. Spacers (84) define the film thickness of about 10-30 microns, and this may also be assisted by putting glass fibres (not shown) of known width in the cell cavity. The conducting films (83) may uniformly cover the whole inner surface of the plates (82) or may be etched into a suitable pattern, e.g. dots or a seven segment display. Regions (85) of the film may be thermally addressed by a focussed beam (86) from a laser (87) By means of appropriate optics and beam directing systems (not shown) the beam (86) may be moved around to focus on other regions of the film (81), so as to write information thereupon.

In use with a liquid crystal polymer of the invention, field induced alignment of a region (85) of the polymer occurs when an electric field of sufficient strength is applied via the conducting films (83) if the region of polymer (85) is heated to a temperature above Tc by the beam (86). This alignment is durable on cooling, but less effective alignment and less durability may also be achieved by heating into the range Tf to Tc.

The aligned texture in the region (85) may be stored with the applied field removed, at temperatures below Tf. In the unaligned state the polymer (81) is opaque and provides minimal light transmission, whilst the field aligned stored texture is optically isotropic and appears transparent. Alternatively the polymer (81) may be aligned by heating in the presence of an aligning field and allowing it to cool, so storing a transparent texture over the whole of the polymer, and the regions (85) may have opaque unaligned texture durably written into them by heating above Tc in the absence of an aligning field.

The stored texture may be erased either by heating the whole polymer (81) above Tc and cooling in the presence of an aligning field, or by changing the electric field parameters, e.g. its frequency, direction or any combination thereof.

In a typical device constructed and used as described above, the polymer 2 was used with the pleochroic dyes mentioned above. A HeNe laser operating continuous wave at 633 nm was used with appropriate focussing and directing optics. The power required for writing and measured at the sample plane is typically 5-10 mw at room temperature and sample sensitivities of approximately 12 nJ μm$^{-2}$ have been calculated.

In one addressing mode used for non-scanning experiments a single laser source has been used to gather all the information for write, read, selective, erase, grey scale, bulk erase and fatigue testing. This mode employs an analogue driven acoustooptic modulator to provide a low (sub writing threshold) probe beam for reading and uses higher energy pulses for writing. In positive contrast writing (i.e. opaque scattering textures on a clear background) a 75-80% decrease in the read channel signal could be achieved on spot formation using 100-300 μs writing pulses. The read level is restored by selective erasure with the same pulse width and laser power applied in conjunction with a field. Bulk erasure, i.e. use of an electric field only to erase written information was also demonstrated at room temperature and at elevated temperatures.

Fields of 60-100 Vrms and less at 3 KHz sinewave were more than sufficient to align 10 μm thick samples when the polymers were cooled with the field from the molten state. These fields were lower than those reported in Ref 8.

Writing speeds for visible lines of 30-90 mm μs⁻¹ were possible using the device and polymer 2. Line widths of 5-20 μm were attainable, and the device could be taken through serveral write-erase cycles without degradation.

A technique was used to test the reproducibility and fatigue occurring in liquid crystal polymers and LMM liquid crystal materials by observing digital eye patterns from a static sample which is continually written to and erased and monitored as described above with a low probe beam from the single laser source.

These tests showed the polymer 2 to retain clear discrimination between written and erased states by an order of magnitude greater than S2 samples using the same technique. Polymers such as polymer 2 were tested up to 5000 write/erase cycles whilst S2 failed after 500 write/erase cycles. Furthermore the polymer was superior in gray scale test to S2 on extended testing runs.

When used with a mixture of a polymer of the invention and an LMM smectic material, the device may be used in essentially the same fashion. The mode of operation is identical to that of known devices capable of using pure S2 as an optical storage medium.

In the device described and illustrated grey scaling may be achieved in the positive contrast mode, i.e. where unaligned opaque texture is written into a background of aligned transparent texture by heating the region (85) to a temperature above Tc and allowing it to cool in the presence of an electric field which is insufficient to wholly re-align the addressed region, but only sufficient to partly re-align it. Alternately grey scaling can be performed in the writing step by using shorter write pulses of constant energy or laser pulses of the required length but of lower energy.

We claim:

1. An electro-optic information storage device comprising two substantially parallel walls, defining a space therebetween, each wall having an electrode layer on that one of its major surfaces which faces the other said wall; and a quantity of liquid crystal polymer (LCP) optical storage medium within said space and in contact with each said electrode, said liquid crystal polymer optical storage medium having a general formula I

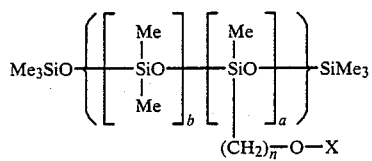

wherein X is a mesogenic group having a general structure

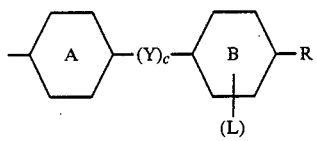

wherein

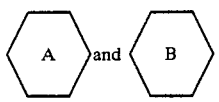

may carry lateral methyl, fluro or chloro substituents, and are selected from phenyl, trans-cyclohexyl, pyridyl, pyri midyl, dioxanyl and bicyclo-(2,2,2)-octyl;
  wherein Y is COO, OOC or $CH_2CH_2$, C is 0 or 1;
  wherein n is an integer between 4 and 9 inclusive;
  wherein R is F, $CF_3$, CN, $R^1$, $OR^1$ or $COOR^1$ where $R^1$ is alkyl, and (L) indicates that a lateral methyl or fluoro substituent may be present;
  in cases other than when R is CN and Y is COO and n=5 and C=1, L=$CH_3$: wherein the ratio b:a is less than 3 and greater than 0;
the polymer being a random or substantially random polymer.

2. A storage device according to claim 1, wherein X in Formula I is selected from structures (Xa) to (Xi) as follows:

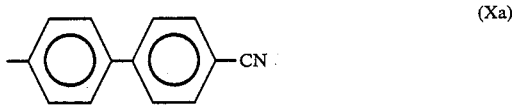
(Xa)

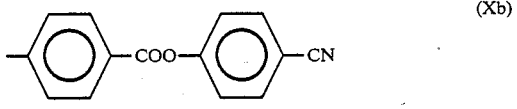
(Xb)

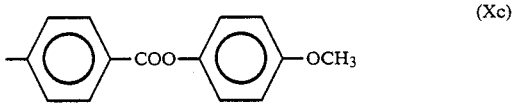
(Xc)

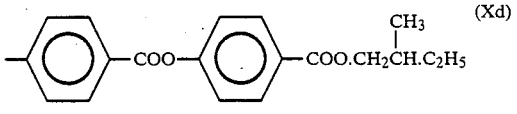
(Xd)

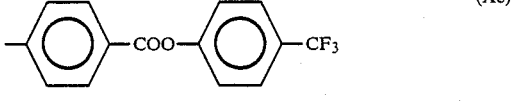
(Xe)

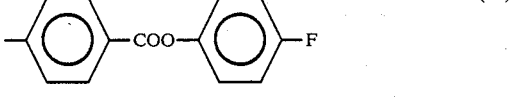
(Xf)

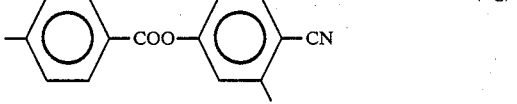
(Xg)

(Xh)

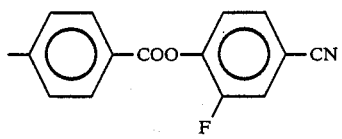

(Xi)

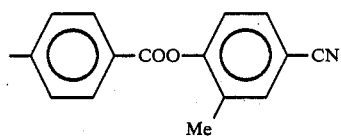

3. A device according to claim 2, wherein the ratio b:a of said LCP is between 1.4:1 and 1:1.4.

4. A device according to claim 2, wherein the average degree of polymerisation ($\overline{DP}$) of said LCP is in the range 10 to 100 inclusive.

5. A device according to claim 2, wherein the polydispersity of said LCP is between 1 and 20.

6. A device according to claim 1, wherein said optical storage medium comprises a mixture of at least two compounds, at least one of which is an LCP of Formula I and at least one of which is a liquid crystal material having a molecular mass less than 500 ("LMM liquid crystal material").

7. A device according to claim 6, wherein said LMM liquid crystal material shows a smectic phase.

8. A device according to claim 7, wherein said LMM liquid crystal material contains at least one compound of formula

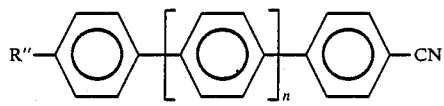

where n is 0 or 1 and R" is n-alkyl or n-alkoxy containing 8 to 12 carbon atoms.

9. A device according to claim 8, wherein said LMM liquid crystal material contains

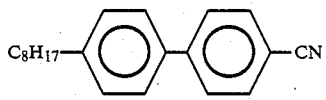

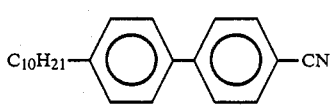

and

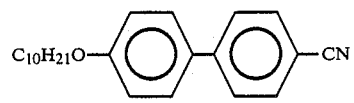

10. A device according to claim 9, wherein X of said LCP is selected from structures (Xa) to (Xg)

(Xa)

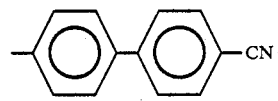

(Xb)

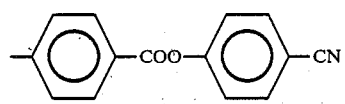

(Xc)

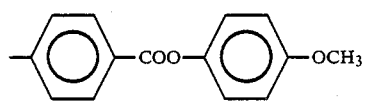

(Xd)

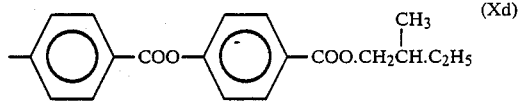

(Xe)

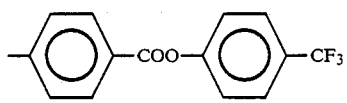

(Xf)

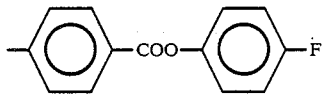

(Xg)

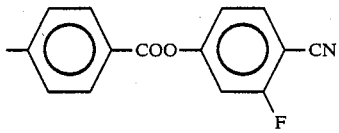

and the ratio b:a is between 1.4:1 and 1:1.4.

11. A device according to claim 10, wherein X has a structure (Xb).

12. A device according to claim 10, wherein said optical storage medium also contains a pleochroic dye.

13. A device according to claim 12, wherein said pleochroic dye is a suitable anthroquinone dye.

* * * * *